United States Patent
Lee

(10) Patent No.: US 10,638,050 B2
(45) Date of Patent: Apr. 28, 2020

(54) METHOD FOR SETTING PHOTOGRAPHED IMAGE OF PTZ CAMERA AND APPARATUS THEREFOR

(71) Applicant: YNM SYSTEMS INC., Seoul (KR)

(72) Inventor: Myung-ho Lee, Seoul (KR)

(73) Assignee: YNM SYSTEMS INC., Seoul (KR)

( * ) Notice: Subject to any disclaimer, the term of this patent is extended or adjusted under 35 U.S.C. 154(b) by 43 days.

(21) Appl. No.: 15/747,956

(22) PCT Filed: May 8, 2017

(86) PCT No.: PCT/KR2017/004739
§ 371 (c)(1),
(2) Date: Jan. 26, 2018

(87) PCT Pub. No.: WO2017/196026
PCT Pub. Date: Nov. 16, 2017

(65) Prior Publication Data
US 2018/0227499 A1 Aug. 9, 2018

(30) Foreign Application Priority Data

May 10, 2016 (KR) .......................... 10-2016-0056884

(51) Int. Cl.
*H04N 5/232* (2006.01)
*H04N 7/18* (2006.01)
(Continued)

(52) U.S. Cl.
CPC ....... *H04N 5/23296* (2013.01); *G06F 3/0482* (2013.01); *H04N 5/23216* (2013.01);
(Continued)

(58) Field of Classification Search
None
See application file for complete search history.

(56) References Cited

U.S. PATENT DOCUMENTS

2006/0256201 A1* 11/2006 Shuttleworth ... G08B 13/19619
  348/211.9
2013/0021433 A1* 1/2013 Belsarkar ............... H04N 7/181
  348/36

(Continued)

FOREIGN PATENT DOCUMENTS

JP  2006186938 A  7/2006
JP  2008098961 A  4/2008

(Continued)

OTHER PUBLICATIONS

Title: How to Configure Presets and Patterns on a Pan Tilt Zoom Camera—PTZ LX700L12X Series Author: Security Camera King Date: Mar. 22, 2014 URL: https://www.youtube.com/watch?v=pb3mvHq8WUg (Year: 2014).*

(Continued)

*Primary Examiner* — Twyler L Haskins
*Assistant Examiner* — Wesley J Chiu
(74) *Attorney, Agent, or Firm* — Harness, Dickey & Pierce, P.L.C.

(57) ABSTRACT

The present disclosure in some embodiments provides a method of setting a captured image by a pan-tilt-zoom camera (PTZ camera) and an apparatus therefor. A method of setting a captured image by a PTZ camera and an apparatus therefor are disclosed for setting captured images of a plurality of image capturing areas, to enable prompt setting of multiple images with the PTZ camera changing its targeted imaging areas while maintaining an On Screen Display setting mode (OSD setting mode) for captured image setting.

7 Claims, 5 Drawing Sheets

(51) Int. Cl.
*G06F 3/0482* (2013.01)
*H04N 5/262* (2006.01)
*H04N 5/445* (2011.01)

(52) U.S. Cl.
CPC ..... *H04N 5/23245* (2013.01); *H04N 5/23299* (2018.08); *H04N 5/232939* (2018.08); *H04N 5/2628* (2013.01); *H04N 7/18* (2013.01); *H04N 7/183* (2013.01); *H04N 5/44543* (2013.01)

(56) References Cited

U.S. PATENT DOCUMENTS

2014/0123063 A1* 5/2014 Hwang ................ G06F 3/0482
715/810

2015/0341210 A1* 11/2015 Ranbro ................ H04N 5/247
709/222
2016/0277652 A1* 9/2016 Mori ..................... H04N 5/232

FOREIGN PATENT DOCUMENTS

| | | |
|---|---|---|
| JP | 2009055478 A | 3/2009 |
| KR | 1020110045212 A | 5/2011 |
| KR | 101443125 B1 | 9/2014 |

OTHER PUBLICATIONS

Title: PTZ-LX700L12X Color Camera Date: Sep. 3, 2013 (Year: 2013).*

Title: Preset tanimlama nasil yapilir? Author: Bilgi Teknolojileri Date: Oct. 25, 2013 URL: https://www.youtube.com/watch?v=bowNxsHJv9w (Year: 2013).*

* cited by examiner

METHOD FOR SETTING PHOTOGRAPHED IMAGE OF PTZ CAMERA AND APPARATUS THEREFOR

CROSS-REFERENCE TO RELATED APPLICATION

The present application is the US national phase of International Patent Application No. PCT/KR2017/004739, filed May 8, 2017, which claims priority to Korean Patent Application No. 10-2016-0056884, filed on May 10, 2016. The disclosures of the above-listed applications are hereby incorporated by reference herein in their entirety.

TECHNICAL FIELD

The present disclosure in some embodiments relates to a method of setting an image of a pan-tilt-zoom camera (PTZ camera) and an apparatus therefor.

BACKGROUND

The statements in this section merely provide background information related to the present disclosure and do not necessarily constitute prior art.

A PTZ camera has a combined structure of a pan/tilt drive for the up, down, left, right rotational movement and a camera equipped with fully automatic zoom lenses, and it is capable of providing externally controlled camera rotation and zoom in/out operation of the lens. Therefore, compared with common fixed cameras, PTZ cameras are expensive, but enable the operator to monitor the broader area around via controlled camera rotation, and provide the operator with a remote/near distance monitoring capability and a magnified view of the object of interest via the zoom lens control.

It is typical to adjust the area to be imaged by the PTZ camera by the user, who watches the monitor screen outputting the image captured by the camera, operating a controller apparatus such as a controller with a joystick or a remote controller with arrow keys.

A PTZ camera system may use an On Screen Display menu (OSD menu) to process image settings such as focus, white balance, automatic exposure mode (AE mode).

When setting the captured image with the PTZ camera system, the joystick or the arrow keys of the controller apparatus are used for the PTZ camera movement (pan/tilt/zoom) control or the OSD menu setting. Once entering the OSD menu and then the menu setting operation, the user needs to exit an OSD mode that provides the OSD menu first before the user can adjust the image capturing area by the PTZ camera.

In such an arrangement, the more submenu items provided in an OSD menu item, the more menu selection steps need to be taken to complete setting of a single captured image. To finish setting of one captured image and perform the repeat setting operation on other captured images suffers from the cumbersome routine of turning off the OSD mode and adjusting the OSD menu back from the main menu for the other captured images. Increasing the divisions of the area to be captured with the PTZ camera will aggravate the difficult task of OSD menu setting for each captured image. For example, in order to set a focus mode of a first imaged area to 'auto' and set the focus mode of a second imaged area to 'manual', the following complicated process has to be undertaken:
1) Move the PTZ camera to the first imaged area by using the controller apparatus→
2) Call OSD menu→
3) Select Focus/Zoom→
4) Enter Focus mode→
5) Select Auto→
6) Disable OSD menu→
7) Move the PTZ camera to the second imaged area by using the controller apparatus→
8) Call OSD menu→
9) Select Focus/Zoom→
10) Enter Focus mode, and then
11) Select 'Manual'.

When setting the capturing modes of a plurality of image capturing areas, it is necessary to repeat the operations of entering and exiting the OSD mode sequentially for respective image capturing areas to select the OSD menu items, which is cumbersome.

DISCLOSURE

Technical Problem

Therefore, the present disclosure seeks to provide a technology of setting captured images at a plurality of image capturing areas, that is a method of setting a captured image by a PTZ camera and an apparatus therefor, for allowing a prompt setting to be performed on the plurality of image capturing areas with the PTZ camera's imaging area changed while maintaining the OSD mode for setting the captured image.

SUMMARY

In accordance with some embodiments of the present disclosure, an apparatus for capturing an image, capable of controlling setting of a captured image according to a mode in conjunction with a controller apparatus and an image output apparatus, including a Pan-Tilt-Zoom camera (PTZ camera), a signal acquisition unit, a mode control unit and an image output unit. The PTZ camera is configured to capture at least one image of at least one area, so as to generate a captured image. The signal acquisition unit is configured to obtain an operation signal from the controller apparatus. The mode control unit is configured to determine, based on the operation signal, a mode that is entered between a PTZ mode for controlling the PTZ camera and an On Screen Display setting mode (OSD setting mode) for allowing setting in an OSD menu, and in accordance with a determined mode, to control the PTZ camera for changing an image capturing area for the captured image, or control for allowing to set the OSD menu. The image output unit is configured to output at least one of the captured image or the OSD menu to the image output apparatus. Once entered into an OSD lock mode for maintaining the OSD setting mode according to the operation signal, the mode control unit is configured to control the PTZ camera for changing an image capturing area for the captured image while maintaining the OSD setting mode.

In accordance with some embodiments of the present disclosure, a method of setting an image captured by a PTZ camera, performed by an image capturing apparatus capable of controlling setting of a captured image according to a mode in conjunction with a controller apparatus and an image output apparatus, includes obtaining an operation signal from the controller apparatus, and performing a mode entrance based on the operation signal, into a PTZ mode for controlling the PTZ camera or into an OSD setting mode for allowing setting in an OSD menu, and once entered into the OSD setting mode and upon receiving an OSD locking signal, performing a mode control to enter an OSD lock mode for maintaining the OSD setting mode, to control the PTZ camera for changing an image capturing area for the captured image while maintaining the OSD setting mode.

Advantageous Effects

As described above, the present disclosure in some embodiments can promptly perform image setting of a plurality of captured images by using the OSD menu. In addition, the manipulation steps that the user has to take for setting a plurality of captured images can be markedly reduced and the setting operation can be simplified.

DETAILED DESCRIPTION

Hereinafter, at least one embodiment of the present disclosure will be described in detail with reference to the accompanying drawings.

Figure 1:
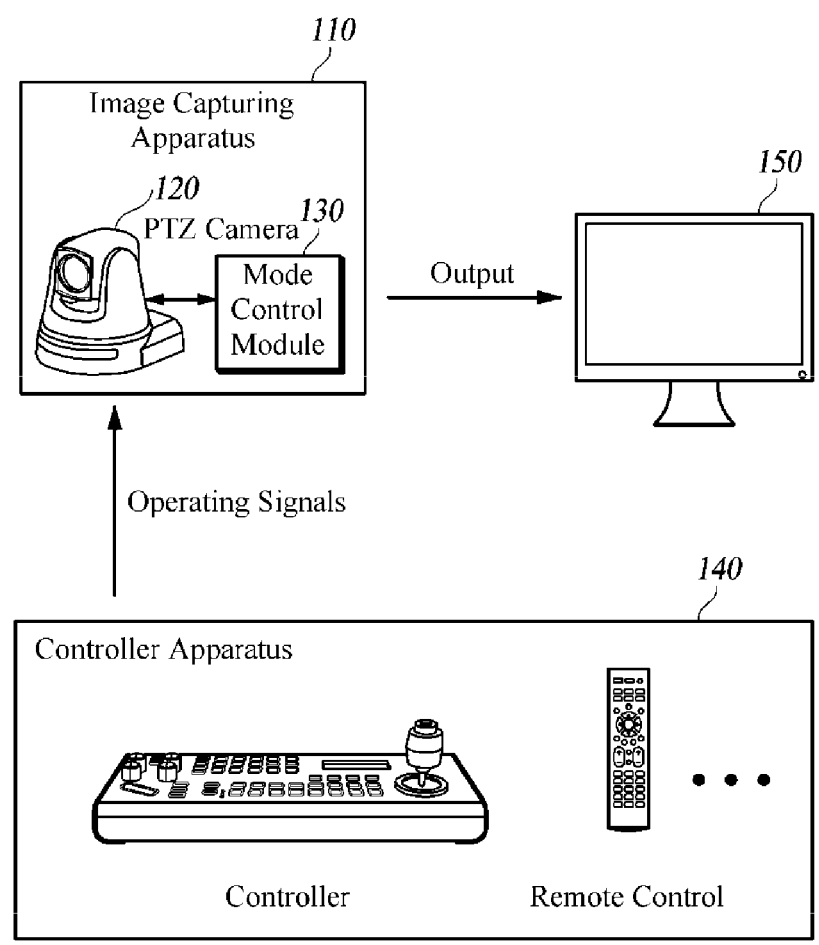
FIG. 1 is a schematic diagram of a captured image control system according to at least one embodiment of the present disclosure.

FIG. 1 is a schematic diagram of a captured image control system according to at least one embodiment of the present disclosure.

A captured image control system according to at least one embodiment includes an image capturing apparatus 110, a controller apparatus 140 and an image output apparatus 150. The image capturing apparatus 110 includes a PTZ camera 120 and a mode control module 130. Although the image capturing apparatus 110 is described as specifically including the PTZ camera 120 and the mode control module 130, it may be provided with only the PTZ camera 120, and the mode control module 130 may be implemented as a separate mode control device (not shown).

The image capturing apparatus 110 captures images of a plurality of areas and renders OSD menus for the captured images to be output through the image output apparatus 150. Here, the image capturing apparatus 110 controls modes including a PTZ mode for adjusting the area to be imaged for generating the captured image based on the operation signal of the controller apparatus 140, an OSD setting mode for setting the OSD menus for the captured images, respectively, and an OSD lock mode for adjusting the area for the captured image while maintaining the OSD setting mode. The following will describe the respective components of the image capturing apparatus 110.

The PTZ camera 120 photographs a user's desired location or area, and it is capable of vertical, horizontal and zoom-in and out control. The PTZ camera 120 can appoint the location to be captured, and it typically has broader camera imaging area (surveillance coverage) than ordinary cameras that just photograph fixed positions.

The PTZ camera 120 may be a speed dome camera placed at a fixed position of a specific place set by the manager. The PTZ camera 120 has functions of a pan, a tilt, a zoom, etc. based on operation signals received from the controller apparatus 140 connected by using wired or wireless communication to adjust the image capturing area. Here, the adjustment of the PTZ camera 120 is preferably controlled by the mode control module 130.

The PTZ camera 120 transmits the captured image to the image output apparatus 150 for output, which may be performed through the mode control module 130.

The mode control module 130 obtains an operation signal for controlling the mode of the image capturing apparatus 110 from the controller apparatus 140, and based on the obtained operation signal, enters one of the PTZ mode, OSD setting mode, OSD lock mode, and executes control corresponding to the entered mode. Here, the operation signal may be a PTZ operation signal, an OSD operation signal, an OSD locking signal, or the like. For example, the PTZ operation signal means a signal for controlling (adjustably changing) the area to be imaged by the PTZ camera 120. The OSD operation signal means a signal for outputting and controlling the OSD menu for image setting of the captured image, and the OSD locking signal means a signal for changing the image capturing area by the PTZ camera 120 while maintaining the OSD menu. These operation signals may be independent signals of each other, but the present disclosure is not necessarily limited thereto, and they may be an operation signal in which a plurality of signals are combined.

When entering the PTZ mode, the mode control module 130 controls the image capturing area by the PTZ camera 120 based on the PTZ operation signal. In other words, in the PTZ mode, the mode control module 130 controls the functions of the PTZ camera 120 such as the pan, the tilt, the zoom, etc. based on the PTZ operation signal to change the image capturing area into another area.

Once entered into the OSD setting mode, the mode control module 130 controls the OSD menu based on the OSD operation signal. The mode control module 130 outputs the OSD menu as being overlaid on the captured image if present, and the mode control module 130 performs setting of the OSD menu based on the OSD operation signal.

Once entered into the OSD lock mode, the mode control module 130 controls the image capturing area by the PTZ camera 120 based on the OSD locking signal while maintaining the OSD setting mode, i.e., the OSD menu. In other words, adapted to rapidly process image settings of a plurality of image capturing areas, the OSD lock mode enables the mode control module 130 upon receiving an additional PTZ operation signal input to control the PTZ camera 120 for changing the image capturing area for the captured image while maintaining the OSD menu output by the OSD setting mode, and to allow for setting the OSD menu for the captured image after change over the captured image after change as being output.

Here, the mode control module 130 is described as changing the image capturing area while maintaining the OSD menu output in the OSD lock mode, but the present disclosure is not necessarily limited thereto. For example, in order to accurately change the image capturing area in the OSD lock mode, the mode control module 130 may save the OSD menu output by the OSD setting mode, and then render the captured image alone to be output. Thereafter, the mode control module 130 may control the PTZ camera 120 based on the PTZ operation signal to change the image capturing area, and when the change of the image capturing area is completed, it may render the stored OSD menu to be output on the captured image after change.

The controller apparatus 140 interworks with the image capturing apparatus 110 and transmits various operation signals to the image capturing apparatus 110 in accordance with the operation of the user. The controller apparatus 140 may be implemented by apparatuses including a controller that transmits an operation signal in response to a user's operation of a joystick, a button, etc., and a remote controller that transmits an operation signal according to a user's button input. The controller apparatus 140 may be implemented by various types of apparatuses as long as it can transmit operation signals to the image capturing apparatus 110.

The controller apparatus 140 sends the image capturing apparatus 110 operation signals including a PTZ operation signal for adjusting the image capturing area by the PTZ camera 120, an OSD operation signal for controlling the OSD menu for image setting of the captured image, and an OSD locking signal for changing the image capturing area while maintaining the OSD menu of the captured image. Here, the controller apparatus 140 may transmit the PTZ operation signal according to the upward/downward/rightward/leftward adjustment of the joystick or an input by the up, down, left and right adjustment buttons, and transmit OSD operation signal based on the input of a preset OSD menu button. Further, the controller unit 140 may transmit the OSD lock signal in response to the input of a preset OSD locking button. Here, after the OSD locking button input is made, the OSD locking signal may be transferred to the image capturing apparatus 110 in response to an upward/downward/rightward/leftward adjustment of the joystick or an input by the up, down, left and right adjustment buttons, although the present disclosure is not necessarily limited thereto. For example, the OSD locking signal may be transmitted to the image capturing apparatus 110 where the OSD locking button is pressed and when there is an upward/downward/rightward/leftward adjustment of the joystick or an input by the up, down, left and right adjustment buttons.

The controller apparatus 140 may have a separate touch input unit (not shown) for transmitting the OSD locking signal or an external input device (not shown) such as a mouse, a touch pen, a stylus pen, an external keyboard, etc.

The controller apparatus 140 may transmit the OSD locking signal as an independent signal to the image capturing apparatus 110, but it is not necessarily limited thereto, and the OSD locking signal may be transmitted as being included in the PTZ operation signal.

The image output apparatus 150 represents a device for obtaining and displaying various image related data from the image capturing apparatus 110. The image output apparatus 150 may obtain image related data by using wired or wireless communication such as wired communication, wireless LAN signal, Bluetooth, Zigbee or the like. Here, the image related data may include a captured image, OSD menu information, attribute information of a captured image, and the like.

The image output apparatus 150 according to some embodiments obtains a captured image of a predetermined area from the image capturing apparatus 110, and outputs the obtained captured image. Here, the image output apparatus 150 may output the newly captured image after change over the current display of the previously outputted captured image.

Upon receiving the OSD menu information from the image capturing apparatus 110, the image output apparatus 150 outputs the OSD menu information over the previously outputted shot image. Here, the image output apparatus 150 outputs the current position of the OSD menu based on the input signal of the image capturing apparatus 110.

Figure 2:
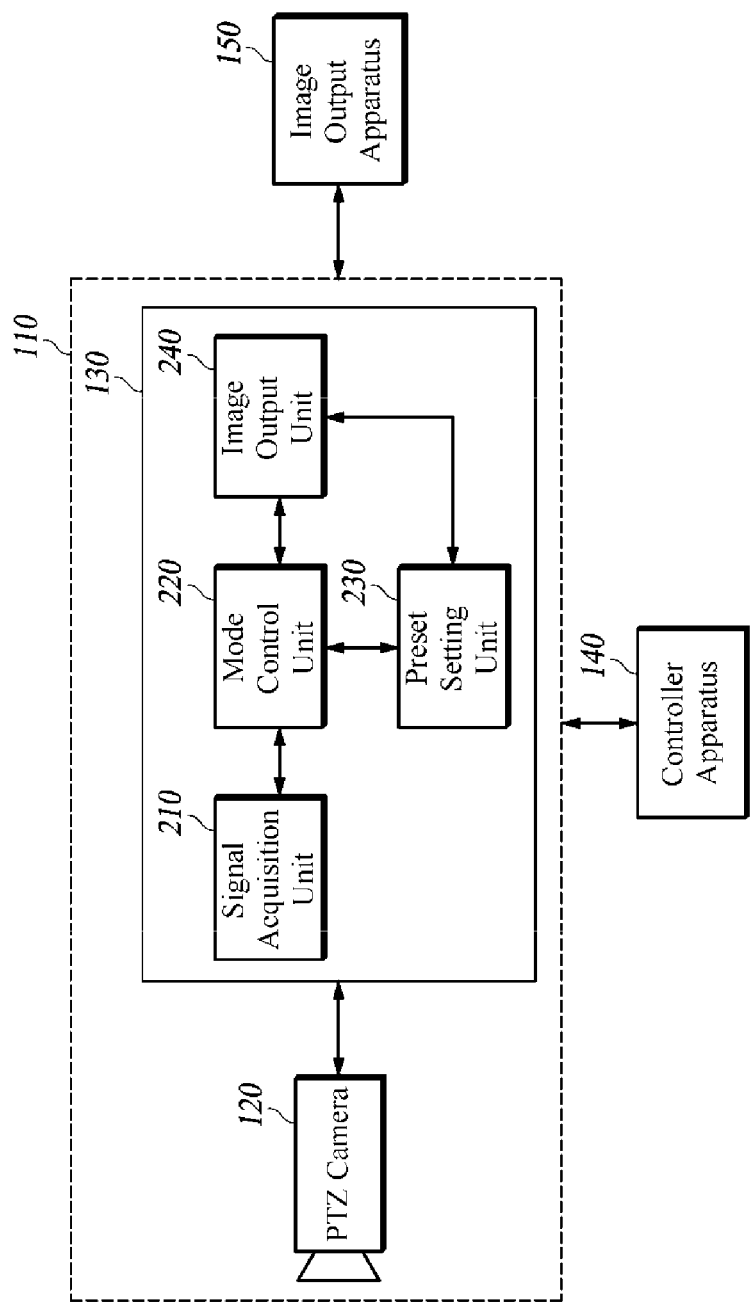
FIG. 2 is a schematic block diagram of a mode control module included in a captured image control system according to at least one embodiment of the present disclosure.

FIG. 2 is a schematic block diagram of a mode control module included in a captured image control system according to at least one embodiment of the present disclosure.

The mode control module 130 according to some embodiments includes a signal acquisition unit 210, a mode control unit 220, a preset setting unit 230 and an image output unit 240.

The signal acquiring unit 210 interworks with the controller apparatus 140 to obtain various signals. The signal acquiring unit 210 is responsive to a user operation or input for receiving an operation signal for controlling the mode of the image capturing apparatus 110 from the controller apparatus 140. Here, the operation signal may be a PTZ operation signal, an OSD operation signal, an OSD locking signal, or the like. For example, the PTZ operation signal refers to a signal for controlling or adjustably changing the image capturing area by the PTZ camera 120. The OSD operation signal refers to a signal for outputting and controlling the OSD menu for carrying out image setting of the captured image, and the OSD locking signal refers to a signal for changing the image capturing area by the PTZ camera 120 while maintaining the OSD menu. These operation signals may be independent of each other, but the present disclosure is not necessarily limited thereto, and they may be an operation signal in which a plurality of signals are combined.

The mode control unit 220 determines the operation mode based on the operation signal obtained by the signal acquisition unit 210, and executes control corresponding to the determined mode.

Based on the operation signal, the mode control unit 220 determines the operation for entering one of the modes such as the PTZ mode, the OSD setting mode and the OSD lock mode. For example, upon receiving a PTZ operation signal, the mode control unit 220 determines to enter the PTZ mode, and when the OSD operation signal is received, it determines to enter the OSD setting mode. In addition, it determines entry into the OSD lock mode when the OSD locking signal is received. Here, the OSD locking signal can be received as being included in the PTZ operation signal.

Upon entering the PTZ mode, the mode control unit 220 controls the image capturing area by the PTZ camera 120 based on the PTZ operation signal. In other words, in the PTZ mode, the mode control unit 220 controls functions such as the pan, tilt, zoom, etc. of the PTZ camera 120 based on the PTZ operation signal to change the image capturing area. For example, when the mode control unit 220 enters the PTZ mode for the first time, the PTZ camera 120 may be controlled to take a captured image of the first area that ranges from 0° to 120°, and based on the PTZ operation signal inputted after imaging in the first area, to take the captured image of the second area in the range of 120° to 240°. Further, based on the PTZ operation signal inputted after imaging in the second area, the PTZ camera 120 may be controlled to take a captured image of the third area in the range of 240° to 360°.

Upon entering the OSD setting mode, the mode control unit 220 controls the OSD menu based on the OSD operation signal. The mode control unit 220 outputs the OSD menu as being overlaid on the captured image if present, and it performs setting of the OSD menu based on the OSD operation signal. For example, at the time of entrance into the OSD setting mode, the mode control unit 220 may output the main menu and enter a first submenu, a second submenu, etc. based on the OSD operation signal. The OSD menu may be configured as shown in the following [Table 1].

TABLE 1

| Main Menu | 1st Submenu | 2nd Submenu |
| --- | --- | --- |
| <Focus/Zoom> | Focus Mode | Semiauto/Auto/Manual |
| | Focus Near Limit | 1 cm/11 cm/30 cm/0.8 m/1.2 m/ |
| | | 1.4 m/1.65 m/2.0 m/2.5 m/3.1 m/ |
| | | 4.2 m/6 m/10 m/20 m/Over Inf |
| | AF Sensitivity | Normal/Low |
| | Digital Zoom | On/Off |
| | Zoom Speed | 0~4~7 |
| <White Balance> | Mode | Auto/Indoor/Outdoor/One |
| | | Push/ATW/Manual/Outdoor |
| | | Auto/Sodium Auto/Sodium/ |
| | | Sodium Out Auto |
| | Red Gain | 0~211~255 |
| | Blue Gain | 0~156~255 |
| <AE Mode> | Mode | Full Auto/Bright/Shutter Pri/Iris |
| | | Pri/Manual |
| | Gain Limit | 9.2 dB~15.4 dB~43.1 dB |
| | Exp Comp | Off, −10.5 dB~0 dB~10.5 dB |
| | Shutter Speed | 1/1~1/60~1/10000 |
| | Iris Level | F1.6~F14, CLOSE |
| | Gain Level | 0 dB~43.1 dB |
| | Bright Level | 0~14~27 |
| <Auto Exposure> | Slow Shutter | On/Off |
| | BLC | On/Off |
| | WDR | On/Off/VE |
| | HR Mode | On/Off |
| | Image Stabilizer | On/Off/Hold |
| | Day/Night | Day/Night/Auto |
| | Threshold Level | 0~28 |

For example, when setting the OSD menu of a single captured image in the OSD lock mode, the mode control unit 220 may operate to output the main menu, select one of the output main menu items (e.g., Focus/Zoom), select, from among first submenu items of the selected menu item, a submenu item for making a change (e.g., Focus Mode), and then select one of second submenu items (e.g., Auto) to complete the OSD menu setting of the captured image.

Once entered into the OSD lock mode, the mode control unit 220 controls the image capturing area by the PTZ camera 120 based on the OSD locking signal while maintaining the OSD setting mode, i.e., the OSD menu. In other words, adapted to rapidly process image settings of a plurality of image capturing areas, the OSD lock mode enables the mode control unit 220 upon receiving an additional PTZ operation signal input to control the PTZ camera 120 for changing the image capturing area for the captured image while maintaining the OSD menu output by the OSD setting mode, and to allow for setting the OSD menu for the captured image after change over the captured image after change as being output.

Here, the mode control unit 220 is described as changing the image capturing area while maintaining the OSD menu output in the OSD lock mode, but the present disclosure is not necessarily limited thereto. For example, in order to accurately change the image capturing area in the OSD lock mode, the mode control unit 220 may save the OSD menu output by the OSD setting mode, and then render the captured image alone to be output. Thereafter, the mode control unit 220 may control the PTZ camera 120 based on the PTZ operation signal to change the image capturing area, and when the change of the image capturing area is completed, it may render the stored OSD menu to be output over the captured image after change.

The mode control unit 220 in the OSD lock mode, can output a single OSD menu, and thereby make adjustments to captured images of a plurality of areas, which is superior in promptness and convenience over the ordinary OSD setting methods involving recurring entrance to an OSD menu for every captured image.

The image capturing area for the captured image is described as being changed while maintaining the OSD menu by the mode control unit 220 in the OSD lock mode based on the OSD locking signal or the PTZ operation signal received in the OSD lock mode, but the captured image may also be set to be changed automatically by user's setting. Specifically, the mode control unit 220 in the OSD lock mode, may change the image capturing area by the PTZ camera 120 automatically at each preset time interval according to user's setting. Here, the time interval at which the captured image by the PTZ camera 120 is automatically changed may vary according to the desired setting time of the user. For example, when the mode control unit 220 is set so that the image capturing area for the captured image is changed every minute in the OSD lock mode, the mode control unit 220 sets the OSD menu for 1 minute for the captured image of the first area in the range of 0° to 120° based on the user's operation, and the elapse of 1 minute automatically switches the image to the captured image of the second area in the range of 120° to 240°. Thereafter, the mode control unit 220 sets the OSD menu for 1 minute for the captured image of the second area based on the user's operation, and the elapse of 1 minute automatically switches the image to the captured image of the third area in the range of 240° to 360°. Then, the mode control unit 220 may set the OSD menu for 1 minute for the captured image of the third area based on the user's operation.

The preset setting unit 230 performs an operation of saving and managing the setting of each captured image that is captured in the plurality of areas. The preset setting section 230 saves each OSD setting information when the mode control section 220 completes the OSD setting of the captured image of each of the plurality of areas. The stored OSD setting information may be provided when the PTZ camera 120 performs the imaging or monitoring operation of the area.

The image output unit 240 transmits the captured image from the PTZ camera 120 to the image output apparatus 150 and renders the same to be outputted, and renders the OSD menu to be outputted as needed based on the mode determined by the mode control unit 220.

Figure 3:
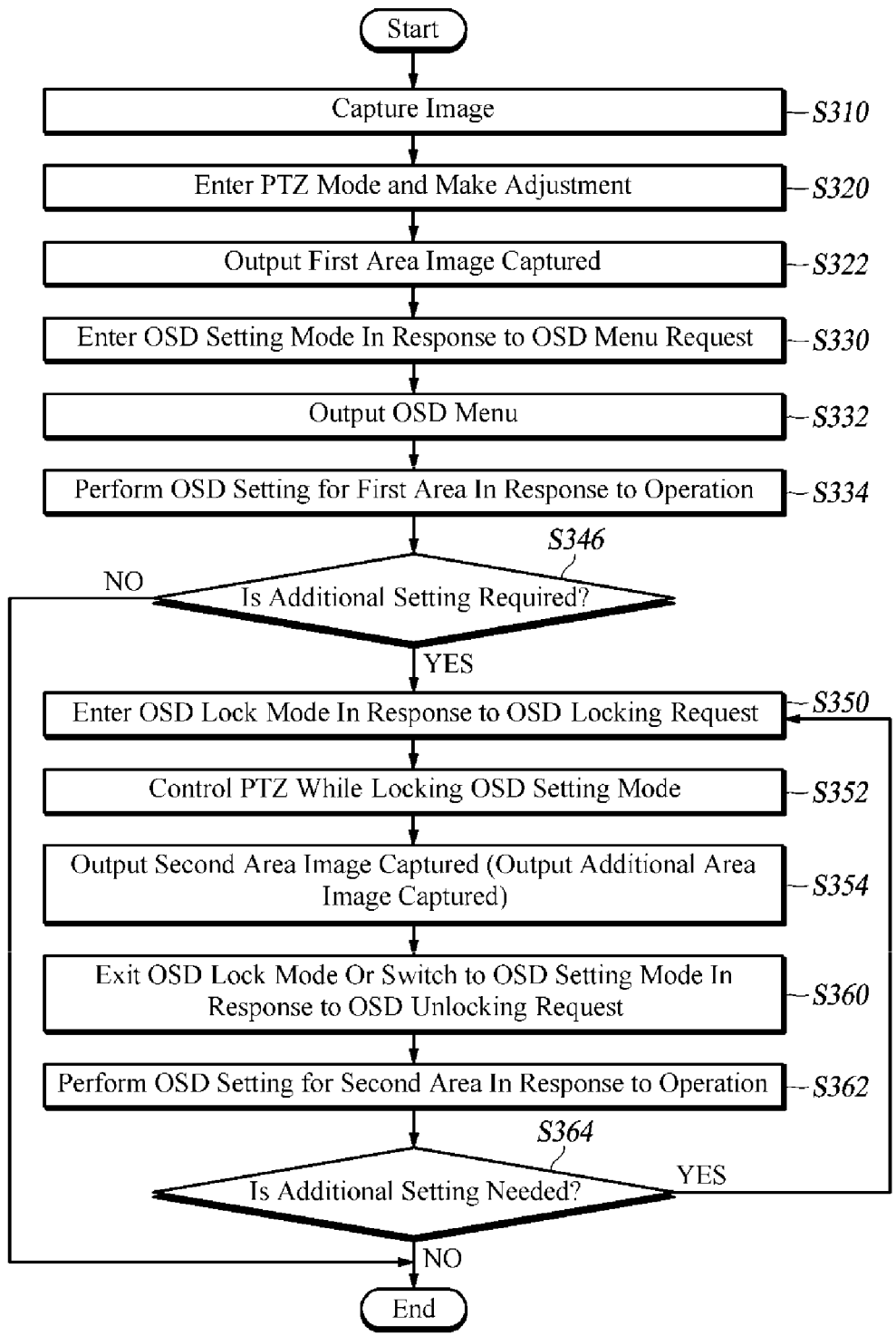
FIG. 3 is a flowchart of a captured image setting method for controlling a PTZ camera in an OSD lock mode according to at least one embodiment of the present disclosure.

FIG. 3 is a flowchart of a captured image setting method for controlling a PTZ camera in an OSD lock mode according to at least one embodiment of the present disclosure.

The image capturing apparatus 110 utilizes the PTZ camera 120 for generating a captured image by capturing a predetermined area (S310).

Upon receiving the PTZ operation signal from the controller apparatus 140, the image capturing apparatus 110 enters the PTZ mode for making adjustment of the area for image capturing by the PTZ camera 120 (S320), renders the captured image of the adjusted first area to be output via the image output apparatus 150 (S322). Here, the image capturing apparatus 110 may control the functions of the PTZ camera 120 such as the pan, the tilt, the zoom, etc. based on the PTZ operation signal.

Upon receiving the OSD operation signal with the captured image of the first area outputted, the image capturing apparatus 110 enters OSD setting mode (S330), and it renders the OSD menu corresponding to the OSD setting mode to be outputted (S332). Here, it is desirable that the OSD menu is overlaid on the screen where the captured image of the first area is outputted.

With the OSD menu being outputted, the image capturing apparatus 110 performs the OSD menu setting based on the OSD operation signal (S334).

Upon receipt of the OSD locking signal from the controller apparatus 140, the image capturing apparatus 110 determines that additional setting of another area is required (S346), and it enters the OSD lock mode based on the OSD locking signal (S350). Here, the OSD lock mode is a mode for quickly processing the image setting of the plurality of image capturing areas, which enables to control the image capturing area by the PTZ camera 120 while locking or maintaining the OSD menu of the OSD setting mode.

Upon receiving the PTZ operation signal in the OSD lock mode, the image capturing apparatus 110 adjusts the image capturing area by the PTZ camera 120 based on the PTZ operation signal while maintaining the OSD setting mode (S352).

While maintaining the OSD setting mode, the image capturing apparatus 110 renders the captured image of the second area after adjustment or change to be output through the image output apparatus 150 (S354).

In response to the OSD unlocking signal, the image capturing apparatus 110 cancels or exits the OSD lock mode (S360). Here, the image capturing apparatus 110 is switched to the OSD setting mode from the OSD lock mode.

The image capturing apparatus 110 receives the OSD operation signal from the controller apparatus 140 and performs the OSD menu setting for the captured image of the second area (S362).

When setting the captured image of an additional area other than the captured image of the second area (S364), the image capturing apparatus 110 repeats the processing of Steps S350 to S362 to perform OSD menu setting for captured images of the additional areas.

Although Steps S310 to S364 are described to be sequentially performed in the example shown in FIG. 3, it merely instantiates a technical idea of some embodiments of the present disclosure. Therefore, a person having ordinary skill in the pertinent art could appreciate that various modifications, additions, and substitutions are possible by changing the sequences described in FIG. 3 or by executing two or more steps from Steps S310 to S364 in parallel, without departing from the gist and nature of the embodiments of the present disclosure, and hence FIG. 3 is not limited to the illustrated chronological sequence.

Figure 4A:
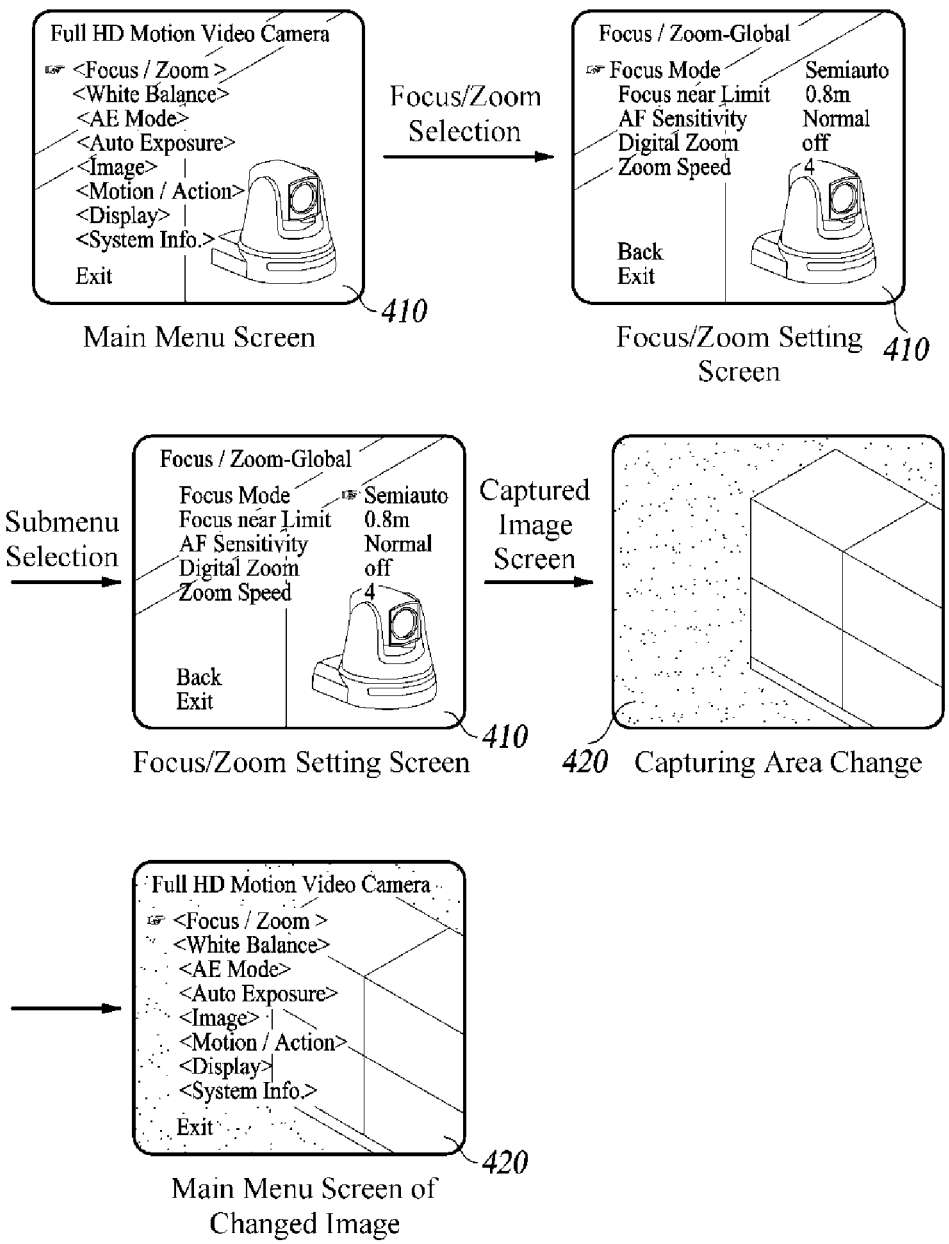
FIGS. 4A and 4B illustrate a conventional operation of setting a captured image and an operation of setting a captured image according to at least one embodiment, respectively.
Figure 4B:
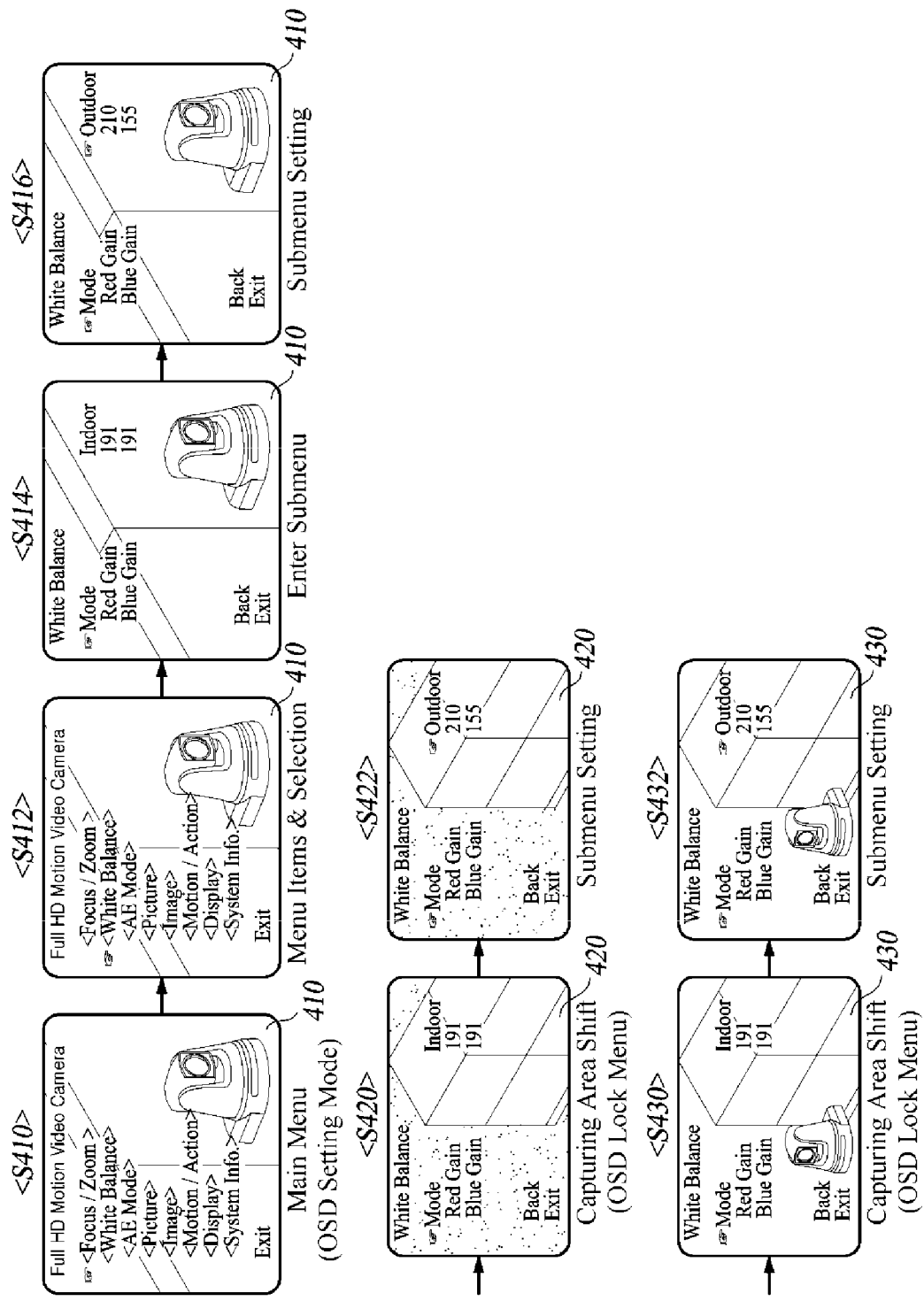

FIGS. 4A and 4B illustrate a conventional operation of setting a captured image and an operation of setting a captured image according to at least one embodiment, respectively.

FIG. 4A is an exemplary view showing a process of performing image setting of each of a first captured image 410 and a second captured image 420 by using a conventional captured image setting method.

As shown in FIG. 4A, with a first captured image 410 being output, the conventional image capturing apparatus enters the OSD mode in accordance with an input of the menu button of the controller apparatus and outputs the OSD menu (main menu screen), selects Focus/Zoom submenu, then enters Focus Mode where it selects Semiauto, and thereafter completes the image setting of the first captured image 410.

Thereafter, the conventional image capturing apparatus unlocks the OSD mode, controls the PTZ camera, switches or changes the first captured image 410 to a second captured image 420, and with the second captured image 420 being output, enters the OSD mode according to the input of the menu button of the controller apparatus. The operation of setting the submenu in the OSD mode is the same as the image setting of the first captured image 410, and its description is omitted. As described above, the conventional image capturing apparatus requires unnecessarily many operations for image setting of a plurality of captured images.

FIG. 4B is an exemplary view showing a process of performing image setting of each of the first captured image 410, the second captured image 420, and a third captured image 430 by using the captured image setting method according to some embodiments of the present disclosure.

As shown in FIG. 4B, the image capturing apparatus 110 obtains the OSD operation signal from the controller unit 140 with the first captured image 410 being output to enter the OSD setting mode and to output the OSD menu (S410), and it selects a White Balance menu on the OSD menu based on the OSD operation signal (S412), and then changes the mode of White Balance from the default setting of Indoor to Outdoor (S414, S416).

Thereafter, the image capturing apparatus 110 obtains the OSD locking signal from the controller apparatus 140 to enter the OSD lock mode, controls the PTZ camera in the OSD lock mode, and changes the first captured image 410 to the second captured image 420 (S420).

The image capturing apparatus 110 maintains the mode of White Balance as being set on the first captured image 410 and changes the mode of White Balance of the second captured image 420 on the basis of the operation signal of the user from Indoor to Outdoor (S422). Here, when the captured image is changed, the image capturing apparatus 110 is shown as providing the default setting screen of the OSD menu, but the present disclosure is not necessarily limited thereto. For example, as shown in FIG. 4B, when the transition is made to the second captured image 420 in the OSD lock mode from the first captured image 410 after changing the mode of White Balance from Indoor to Outdoor, the image capturing apparatus 110 may provide the default setting of Indoor mode of White Balance, although the present disclosure is not necessarily limited thereto.

The image capturing apparatus 110 may operate in the same manner as the method of performing image setting through the transition from the first captured image 410 to the second captured image 420 in the OSD lock mode, when it changes the second captured image 420 to the third captured image 430 and then changes the mode of White Balance of the third captured image 430 from Indoor to Outdoor (S430, S432). As shown in FIG. 4B, the image capturing apparatus 110 can more quickly and easily perform the OSD menu setting for a plurality of captured images, as compared with the conventional image capturing apparatus.

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described not for limitation but for the sake of brevity and clarity. The scope of the technical idea of the present embodiments is not limited by their illustrations. Accordingly, one of ordinary skill would understand the scope of the claimed invention is not to be limited by the explicitly described above embodiments but by the claims and equivalents thereof.

The invention claimed is:

1. An apparatus for capturing an image, capable of controlling setting of a captured image according to a mode in conjunction with a controller apparatus and an image output apparatus, the apparatus comprising:
- a Pan-Tilt-Zoom camera (PTZ camera) configured to capture at least one image of at least one area;
- a signal acquisition unit configured to obtain operation signals from the controller apparatus;
- a mode control unit configured
  - to determine, based on an operation signal for mode selection, a mode that is entered between a PTZ mode for controlling motion of the PTZ camera and an On Screen Display setting mode (OSD setting mode) for allowing setting in an OSD menu, and
  - in accordance with a determined mode, to control the motion of the PTZ camera for changing an image capturing area in response to a PTZ operation signal from the controller apparatus, or control for allowing to set the OSD menu in response to an OSD operation signal from controller apparatus; and
- an image output unit configured to output at least one of the image captured by the PTZ camera or the OSD menu to the image output apparatus, wherein
  - once entered into an OSD lock mode for maintaining the OSD setting mode, the mode control unit is configured to control the motion of the PTZ camera in response to the PTZ operation signal from the controller apparatus while maintaining the OSD setting mode allowing to set the OSD menu in response to the OSD operation signal;
- wherein the mode control unit is configured to control, in the OSD lock mode, the motion of the PTZ camera in response to the PTZ operation signal received from the controller apparatus while keeping displaying, on a screen of the image output apparatus, the OSD menu which has been set and output in the OSD setting mode;
- wherein, when a plurality of image capturing areas to be captured by the PTZ camera and a time interval are set by a user, the mode control unit is further configured to, in the OSD lock mode, automatically adjust the motion of the PTZ camera according to the time interval such that the PTZ camera sequentially captures the plurality of image capturing areas in the time interval, while keeping displaying, on the screen of the image output apparatus, the OSD menu which has been set and output just before change between the areas that the PTZ camera captures.

2. The apparatus of claim 1, further comprising: a preset setting unit configured to save each OSD setting information of each of the plurality of image capturing areas as a separate preset once the plurality of image capturing areas is established by the controlling of the PTZ camera.

3. The apparatus of claim 1, wherein the mode control unit is configured to:
   upon receiving an OSD locking signal in the OSD setting mode, to enter the OSD lock mode for controlling the PTZ camera while maintaining the OSD setting mode.

4. The apparatus of claim 1, wherein the mode control unit is configured to, in response to obtaining the PTZ operation signal, including the OSD locking signal, to enter the OSD lock mode for controlling the PTZ camera based on the obtained PTZ operation signal including the OSD locking signal while maintaining the OSD setting mode.

5. The apparatus of claim 3, wherein the mode control unit is configured to be responsive to the OSD locking signal obtained from a separate OSD locking interface to enter the OSD lock mode for performing the controlling of the PTZ camera as well as the maintaining of the OSD setting mode.

6. A method of controlling a Pan-Tilt-Zoom camera (PTZ camera) the method comprising:
   - obtaining an operation signal from a controller apparatus;
   - performing a mode entrance based on the operation signal, into a PTZ mode for controlling motion of the PTZ camera in response to a PTZ operation signal from the controller apparatus or into an On Screen Display setting mode (OSD setting mode) for allowing setting in an OSD menu; and
   - upon receiving an OSD locking signal, performing a mode control to enter an OSD lock mode and thereby controlling the motion of the PTZ camera in response to the PTZ operation signal from the controller apparatus while maintaining the OSD setting mode allowing to set the OSD menu in response to an OSD operation signal;
   - when a plurality of image capturing areas to be captured by the PTZ camera and a time interval are set by a user, automatically adjusting, in the OSD lock mode, the motion of the PTZ camera according to the time interval such that the PTZ camera sequentially captures the plurality of image capturing areas in the time interval, while keeping displaying, on the screen of the image output apparatus, the OSD menu which has been set and output just before change between the areas that the PTZ camera captures.

7. The method of claim 6, further comprising:
   saving each OSD setting information of each of the plurality of image capturing areas as a separate preset once the plurality of image capturing areas is established by the controlling of the PTZ camera.

* * * * *